Patented Dec. 22, 1931

1,837,330

UNITED STATES PATENT OFFICE

BEVERLY OBER, EDWARD H. WIGHT, AND WILLIAM H. WAGGAMAN, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

DOUBLE SUPERPHOSPHATES

No Drawing.    Application filed March 17, 1927. Serial No. 176,296.

This invention relates to the manufacture of double superphosphates.

Heretofore various processes for producing highly concentrated phosphate fertilizers, containing approximately forty to fifty percent of phosphoric acid have been employed. In general these processes involve the treatment of ground phosphate rock and phosphoric acid in proper quantities and subsequently drying and disintegrating the product. More specifically the prior methods comprehend mixing the ground phosphate rock and the acid in a mixing pan and depositing the resultant sludge in a den. In the den the mass solidifies or "sets" and is removed from there to be subjected to various artificial drying methods.

In these old methods the reactions occurring during the process were carried out in open pans or dens. Such a treatment required a considerable time for completion due, among other things, to the fact that no effective control of the concentrations of the original elements of the mass was exercised. In addition to this disadvantage, the resultant product usually contained an excess of water and acid; the elimination of which involved extensive and expensive drying methods.

It is an object of this invention to provide available double superphosphate without the use of an extended drying period.

Another object is to submit the phosphate raw material to a special treatment to insure a subsequent effective mixing with the acidulating agent.

Another object is to provide a method for manufacturing double superphosphate in which conditions are so controlled that the mixing may be carried on for any predetermined period.

A further object is to devise a process for producing double superphosphate in which high concentrations of the original elements of the mass may be maintained.

Yet another object is to provide a process for making highly concentrated phosphate fertilizer in which the ingredients are efficiently and intimately mixed.

With these and other equally important objects in view, the invention comprehends a special pre-treatment for the phosphate rock and a subsequent novel treatment of the rock and acid to provide optimum reaction conditions and procure an improved product.

In carrying out the process, we prefer to employ phosphoric acid produced in any approved manner. As will appear more fully hereinafter, we may make direct use of phosphorous pentoxide produced by the well known volatilization process.

In carrying out the process, phosphate rock is ground to a suitable degree of fineness to insure rapid acidulation. A desirable state of subdivision for practical operations is obtained when ninety percent of the material passes a sixty mesh screen. The ground rock is then admitted to an autoclave, or similar vessel, which is adapted to retain pressure. This autoclave may be of either the vertical stationary or the horizontal rotary type. We prefer, for considerations to appear hereinafter, to use the horizontal rotary type. This autoclave is provided with a hollow shaft, one end of which may be connected to an acid supply and the other end to a vacuum pump. In addition, the body of the autoclave is apertured to receive blow-off or vent valves.

After the ground rock has been deposited in the container, the latter is sealed. The vacuum pump is then started and the air within the autoclave substantially evacuated. By setting up a vacuum, or reverse pressure, in the autoclave the gases and occluded moisture in the rock are removed.

After the evacuation has been continued for a predetermined time, which is calculated as sufficient to effectively remove the desired quantity of air and excess moisture from the rock the autoclave is sealed and the acid is admitted. It is to be observed that this pre-treatment of the rock tends to greatly accelerate the subsequent reaction between the phosphoric acid and rock. The dried rock is quickly penetrated by the acid and the reactions are more quickly initiated than heretofore. An added advantage of this treatment resides in the fact that in a large measure it eliminates the formation of nodules or clots of rock in the liquid acidifying agent.

During the evacuation and mixing stages, the autoclave may be continuously rotated. This rotation insures a thorough and intimate mixture of the rock and acid. As the rock and acid are thus agitated, certain gases, such as carbon dioxide, are evolved. The extent and amount of this evolution will depend upon the character of the rock used. As the autoclave is sealed these gases cannot escape and there is built up in the autoclave an autogenous pressure. In some instances, particularly when the rock is of a high carbonate content, the pressure may become excessive. If such is the case, the pressure may be lowered by opening a vent valve in the body of the autoclave. If desired, this valve may be replaced by an automatic relief valve set to any predetermined pressure and hence need not require manual manipulation.

The imposition of pressure on the reactive mix tends to retard certain reactions. In this manner, therefore, we are enabled to control the reactivity of the ingredients and hence can maintain the mass in a slurry or mixable condition for any predetermined period. By this method we can be assured of a thorough dispersion of the rock dust in the acid with the attendant advantages of optimum contact surface and maximum utilization of acid. Hence we can obtain a product which contains substantially no excess acid.

By retaining the components of the mix within the autoclave, we obtain other advantages. Substantially all of the initial quantity of water is retained within the autoclave and hence the quantity required for crystallization can be more accurately gauged than could be done in the past.

After the material has been agitated in the autoclave for a time sufficient to insure a thorough mixing of the ingredients the conditions within the autoclave may be adjusted to permit further reaction between the components. An effective method of accomplishing this is to reduce the pressure in the container. This can be done either by opening the relief valve on the autoclave or by setting up a suction in the vacuum line. The reduction in pressure permits the reactions to proceed with the formation of the solid end products.

We have found that the reactions may be accelerated and an improved product obtained by applying heat to the container. Since certain reactions occurring in the process are exothermic, much of the requisite heat is autogenously supplied. Therefore the degree of external heat applied will vary through relatively wide ranges, depending on the character of the rock, as well as the strength of the acid.

The additional heat may be supplied in any desired manner. Gas or oil burners or any other commercial heating apparatus may be placed in close proximity to the autoclave. A more effective method which we employ is to provide the autoclave with an external shell and utilize the space between this shell and the body of the autoclave as a thermal jacket. Steam or any other suitable heating medium may be circulated through the jacket to impart the desired heat to the mix.

When the reaction between the phosphoric acid, or equivalent acidulating materials, and phosphatic dust is complete, the product may be removed from the container. At this stage the reaction product may be transferred to a drying shed or subjected to a drying current of air. We prefer, however, to carry out the drying within the autoclave. To accomplish this, the pressures within the autoclave are first reduced. This may be done by opening the relief valve on the autoclave or by setting the vacuum pump in motion and drawing the vapors through the fluid line, previously described. As the gases are quickly removed from the container, that is to say when the pressure is reduced, there is a corresponding drop in temperature. This temperature drop crystallizes the product and the quick exit of gases entrains and removes much of the excess water. Due to the precautions already noted, the crystallization is very rapid and the product is in a relatively dry state.

After the product has been treated in the manner described, it may be removed from the autoclave. The material is now in a dry state and may be immediately transported to the disintegraters for final grinding. After the grinding the material may be bagged and shipped.

It will now be observed that we have provided a process for manufacturing double superphosphates which is well calculated to effectuate the principles of this invention. The rock is first evacuated in the autoclave and a rapid penetration by the acid is assured. The phosphatic rock and acid are allowed to react and the original concentration of the elements of the mix is maintained for any desired period. The separate stages of the manufacture are effectively carried out in the one container. This we conceive to be decidedly advantageous in that it eliminates the expensive and cumbersome equipment heretofore found necessary.

While we have described a particular process, it is to be understood that this is primarily for the purpose of explaining the underlying principles. As these may be embodied in other specific processes differing in degree from the one described, we do not wish to be restricted to that described except as such restrictions are imposed by the appended claims.

We claim:

1. A process for manufacturing phosphate fertilizer comprising mixing ground phosphatic raw material and phosphoric acid under reduced pressure.

2. A process for manufacturing double superphosphate comprising admitting phosphate rock to a pressure tight container, reducing the pressure therein and subsequently introducing phosphoric acid.

3. A process for manufacturing phosphate fertilizer comprising admitting phosphate rock dust to a pressure tight container, reducing the pressure therein, adding phosphoric acid and subsequently increasing the pressure.

4. A process for manufacturing phosphate fertilizer comprising admitting phosphatic raw material to a container, agitating the material in the container, evacuating the air and occluded moisture therein and adding phosphoric acid.

5. A process for manufacturing double superphosphate characterized by pretreating phosphate rock dust to remove occluded moisture and to accelerate subsequent penetration by phosphoric acid and maintaining the rock and acid in a mixable condition for any predetermined period.

6. A process for manufacturing phosphate fertilizer comprising admitting ground phosphate raw material to a container, withdrawing air therefrom, adding phosphoric acid and subsequently applying heat to the material in the container.

7. A process for manufacturing phosphate fertilizer characterized by mixing ground phosphate rock and phosphoric acid in a deaerated container and allowing the rock and acid to react therein with exclusion of air.

8. A process for manufacturing phosphate fertilizer comprising acidulating phosphate rock in a substantially deaerated container with phosphoric acid, allowing an increase of pressure in the container, heating the mix while excluding air and subsequently decreasing the pressure.

9. A process for manufacturing phosphate fertilizer comprising admitting ground phosphate rock to a container, withdrawing air therefrom, admitting phosphoric acid, applying heat while allowing reaction pressures to build up and subsequently decreasing the pressure and drying the product within the container.

10. A process for manufacturing double superphosphate comprising admitting ground rock to a container, reducing the pressure on the rock and admitting phosphoric acid to the zone of reduced pressure while agitating the mass.

11. A process for manufacturing phosphate fertilizer comprising admitting phosphate rock dust to a pressure tight container, reducing the pressure therein, adding phosphoric acid while agitating the mass and subsequently increasing the pressure.

12. A process for manufacturing phosphate fertilizer comprising admitting ground phosphatic raw material to a container, reducing the pressure therein, adding phosphoric acid while agitating the mass, and subsequently applying heat to the mass within the container.

13. A process for manufacturing phosphate fertilizer comprising admitting ground phosphatic raw material to a container, sealing the autoclave and reducing the pressure therein, admitting phosphoric acid to the zone of reduced pressure while agitating the mass, allowing reaction pressures to build up to a predetermined degree and subsequently applying heat to the mass within the container.

14. A process for manufacturing phosphate fertilizer comprising admitting ground phosphate rock to a container, sealing the container and reducing the pressure therein, admitting phosphoric acid to the zone of reduced pressure while agitating the mass, allowing reaction pressures to build up to a predetermined degree, applying heat to the mass within the container and subsequently reducing the pressure therein.

15. A process for manufacturing phosphate fertilizer comprising introducing ground phosphate rock into a container, sealing the container and reducing the pressure therein, introducing phosphorus pentoxide and water to the zone of reduced pressure while agitating the mass, allowing reaction pressures to build up to a determined degree, applying heat to the mass within the container, and subsequently reducing the pressure therein.

In testimony whereof we affix our signatures.

BEVERLY OBER.
EDWARD H. WIGHT.
WILLIAM H. WAGGAMAN.